(12) United States Patent
Kohama et al.

(10) Patent No.: US 12,192,423 B2
(45) Date of Patent: Jan. 7, 2025

(54) METHOD OF PRODUCING IMAGE DATA AND IMAGE READING SYSTEM

(71) Applicant: SEIKO EPSON CORPORATION, Tokyo (JP)

(72) Inventors: Yuji Kohama, Kitakyushu (JP); Takatoshi Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/487,899

(22) Filed: Oct. 16, 2023

(65) Prior Publication Data

US 2024/0129416 A1    Apr. 18, 2024

(30) Foreign Application Priority Data

Oct. 18, 2022   (JP) ................ 2022-166723

(51) Int. Cl.
*H04N 1/00*   (2006.01)

(52) U.S. Cl.
CPC ..... *H04N 1/00689* (2013.01); *H04N 1/00602* (2013.01); *H04N 1/00702* (2013.01)

(58) Field of Classification Search
CPC ............ H04N 21/42204; H04N 21/47; H04N 21/482; H04N 5/765; H04N 1/32101; H04N 1/32128; H04N 19/186; H04N 19/20; H04N 21/239; H04N 21/42203; H04N 21/4223; H04N 21/4788; H04N 21/4884; H04N 25/76; H04N 5/775; H04N 5/913; H04N 7/15; H04N 7/183; H04N 9/8205; H04N 1/00127; H04N 1/00204; H04N 1/00244; H04N 1/00326; H04N 1/00358; H04N 1/00376; H04N 1/00567; H04N 1/00968; H04N 1/32122; H04N 1/32144; H04N 1/32771; H04N 1/32778; H04N 1/387; H04N 13/204; H04N 13/207; H04N 13/271; H04N 13/282; H04N 13/388; H04N 19/105; H04N 19/132; H04N 19/14; H04N 19/162; H04N 19/18; H04N 19/182; H04N 19/23; H04N 19/30; H04N 19/423; H04N 19/426; H04N 19/428; H04N 19/44;

(Continued)

(56) References Cited

U.S. PATENT DOCUMENTS 7,421,155 B2 * 9/2008 King .................... G06F 40/134
                                                707/E17.085
7,760,944 B2 * 7/2010 Uchikawa .......... H04N 1/00331
                                                358/448

(Continued)

FOREIGN PATENT DOCUMENTS

JP      2012-156964 A    8/2012

*Primary Examiner* — Negussie Worku
(74) *Attorney, Agent, or Firm* — WORKMAN NYDEGGER

(57) ABSTRACT

A method of producing image data includes an image data generation step of reading a document by a reading unit and generating image data as a result of reading the document, a determination step of determining whether a predetermined entry written by a user in the document is present in the image data, and an information addition step of adding specification information to the image data in which the predetermined entry is determined to be present in the determination step, the specification information indicating presence of the predetermined entry.

19 Claims, 13 Drawing Sheets

(58) Field of Classification Search
CPC .. H04N 19/503; H04N 19/507; H04N 19/523;
H04N 19/527; H04N 19/59; H04N
19/593; H04N 19/61; H04N 19/80; H04N
19/82; H04N 19/85; H04N 19/86; H04N
19/87; H04N 19/93; H04N 2005/91328;
H04N 2005/91364; H04N 21/2365; H04N
21/238; H04N 21/23805; H04N 21/2543;
H04N 21/25435; H04N 21/25866; H04N
21/4126; H04N 21/41265; H04N
21/4135; H04N 21/42221; H04N 21/426;
H04N 21/431; H04N 21/4316; H04N
21/4325; H04N 21/4334; H04N 21/4347;
H04N 21/435; H04N 21/43615; H04N
21/43637; H04N 21/4532; H04N 21/454;
H04N 21/4622; H04N 21/4667; H04N
21/47211; H04N 21/4856; H04N
21/4886; H04N 21/8106; H04N 21/8405;
H04N 2201/0082; H04N 2201/3243;
H04N 2201/3247; H04N 2201/3249;
H04N 2201/3254; H04N 2201/3261;
H04N 2201/3264; H04N 2201/3266;
H04N 2201/3269; H04N 2201/327; H04N
2201/3273; H04N 2201/3274; H04N
2209/043; H04N 2209/047; H04N
2213/001; H04N 23/84; H04N 23/843;
H04N 25/00; H04N 25/134; H04N 25/48;
H04N 25/74; H04N 25/77; H04N 5/06;
H04N 5/147; H04N 5/262; H04N 5/32;
H04N 5/325; H04N 5/33; H04N 5/44;
H04N 5/445; H04N 5/45; H04N 5/46;
H04N 5/76; H04N 5/772; H04N 5/783;
H04N 5/85; H04N 7/0122; H04N 7/0125;
H04N 7/014; H04N 7/015; H04N 7/163;
H04N 7/1675; H04N 7/173; H04N 7/186;
H04N 9/22; H04N 9/64; H04N 9/7921;
H04N 9/8042; H04N 9/8047; H04N
9/8063
USPC .................................................. 358/1.15, 498
See application file for complete search history.

(56) References Cited

U.S. PATENT DOCUMENTS

| | | | |
|---|---|---|---|
| 8,418,055 B2 * | 4/2013 | King | G06V 30/224 |
| | | | 707/711 |
| 9,277,063 B2 * | 3/2016 | Kido | H04N 1/3878 |
| 9,736,515 B1 * | 8/2017 | Joshi | G06Q 10/00 |
| 10,242,713 B2 * | 3/2019 | Rothschild | G16H 40/63 |
| 2005/0128516 A1 * | 6/2005 | Tomita | H04N 1/00355 |
| | | | 358/448 |
| 2006/0190459 A1 * | 8/2006 | Wesinger, Jr. | G06Q 30/0623 |
| 2009/0201560 A1 * | 8/2009 | Hashimoto | H04N 1/00816 |
| | | | 382/232 |
| 2012/0194846 A1 * | 8/2012 | Adachi | H04N 1/387 |
| | | | 358/1.14 |
| 2012/0194880 A1 * | 8/2012 | Muroi | H04N 1/32363 |
| | | | 358/474 |
| 2018/0091671 A1 * | 3/2018 | Takemura | G06V 10/242 |
| 2020/0128146 A1 * | 4/2020 | Okamoto | H04N 1/00782 |
| 2020/0310704 A1 * | 10/2020 | Hanano | G06F 3/1204 |

* cited by examiner

METHOD OF PRODUCING IMAGE DATA AND IMAGE READING SYSTEM

The present application is based on, and claims priority from JP Application Serial Number 2022-166723, filed Oct. 18, 2022, the disclosure of which is hereby incorporated by reference herein in its entirety.

BACKGROUND

1. Technical Field

The present disclosure relates to a method of producing image data and an image reading system.

2. Related Art

Users cause scanners to read documents to digitize the documents. Further, users sometimes turn down a corner of a page of interest or a page of special interest (hereinafter referred to as a favorite page) of a document, and use the mark for future reference.

In the related art, there is disclosed an image reading system that reads an image of a document, determines whether the document has a fold at a corner, generates fold information when the document is determined to have a fold, generates a file storing image data of the read document, and writes the fold information in a non-image region of the file (see JP-A-2012-156964).

According to JP-A-2012-156964 described above, the user is required to leave a crease at a favorite page of a document before causing the image reading device to read the document. When a document without a crease is digitized, information indicating favorite pages or parts cannot be stored, and hence there is room for improvement in usability for the user.

SUMMARY

A method of producing image data includes an image data generation step of reading a document by a reading unit and generating image data as a result of reading the document, a determination step of determining whether a predetermined entry written by a user in the document is present in the image data, and an information addition step of adding specification information indicating presence of the predetermined entry, to the image data in which the predetermined entry is determined to be present in the determination step.

An image reading system includes a reading unit configured to read a document, and a control unit configured to cause the reading unit to read the document, and generate image data as a result of reading the document, determine whether a predetermined entry written by a user in the document is present in the image data, and add specification information indicating presence of the predetermined entry, to the image data in which the predetermined entry is determined to be present.

DESCRIPTION OF EMBODIMENTS

Embodiments of the present disclosure are described below with reference to the drawings. Note that each of the drawings is merely illustrative for describing the embodiments. Since the drawings are illustrative, proportions, shapes, and shading may not be precise, consistent, or may be partially omitted.

1. OVERALL DESCRIPTION OF SYSTEM CONFIGURATION

Figure 1:
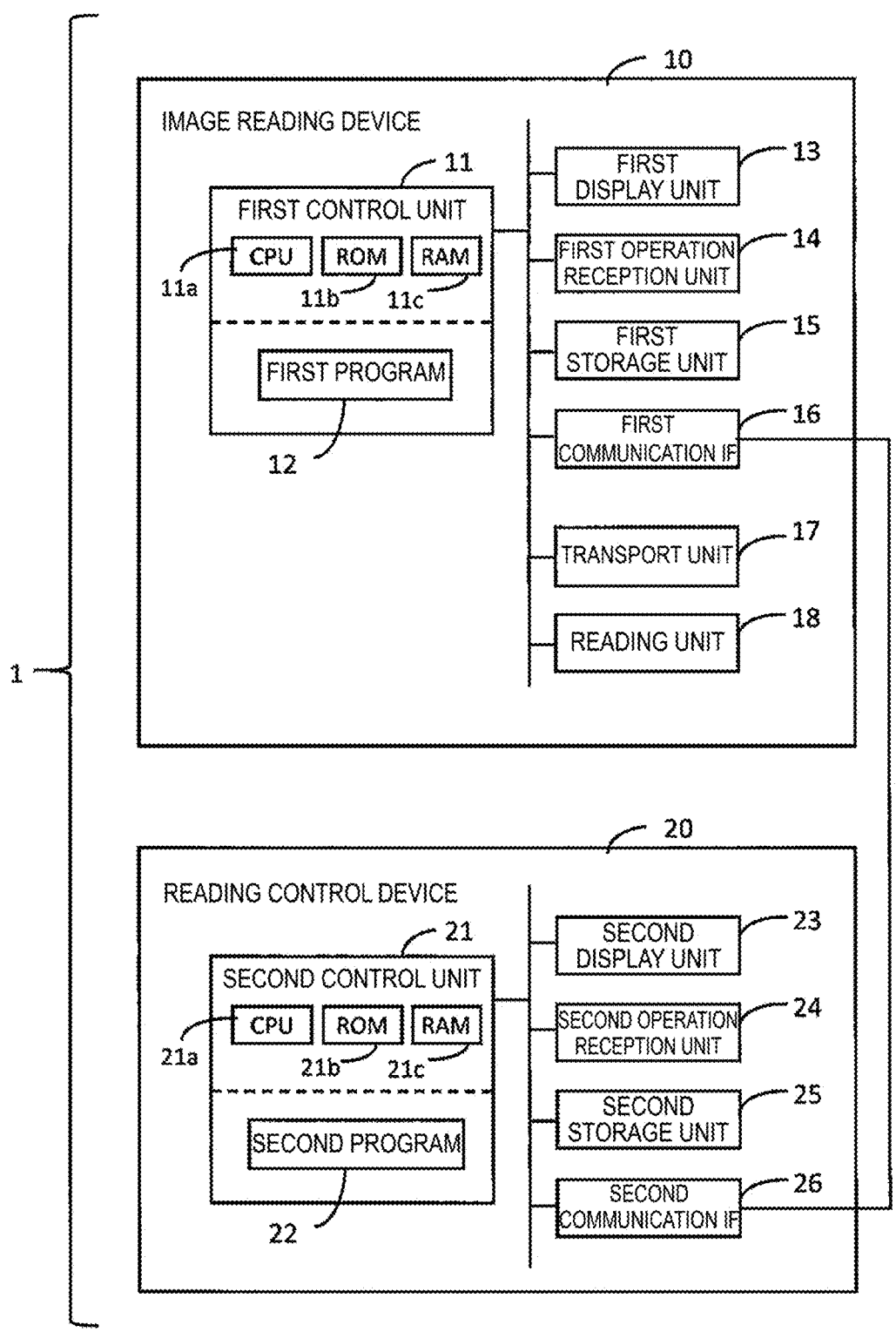
FIG. 1 is a diagram illustrating a system configuration in a simplified manner.

FIG. 1 illustrates a configuration of an image reading system 1 according to the present embodiment in a simplified manner. The image reading system 1 includes an image reading device 10 and a reading control device 20. A method of producing image data is executed by at least a part of the configuration of the image reading system 1.

The image reading device 10 is a scanner of a sheet-feed type, and includes a first control unit 11, a first display unit 13, a first operation reception unit 14, a first storage unit 15, a first communication IF 16, a transport unit 17, a reading unit 18, and the like. IF is an abbreviation for interface. The first control unit 11 includes, as a processor, one or more ICs including a CPU 11a, a ROM 11b, a RAM 11c, and the like, another non-volatile memory, and the like.

In the first control unit 11, the processor, that is, the CPU 11a executes arithmetic processing in accordance with a first program 12 stored in the ROM 11b, the other memory, or the like, using the RAM 11c or the like as a work area, to execute the processing according to the present embodiment. The first program 12 is also referred to as firmware. The processor is not limited to the single CPU, and a configuration may be adopted in which the processing is executed by a hardware circuit such as a plurality of CPUs, an ASIC, or the like, or a configuration may be adopted in which the CPU and the hardware circuit work in concert to execute the processing.

The first display unit 13 is a unit that displays visual information, and is constituted by, for example, a liquid crystal display, an organic EL display, or the like. The first display unit 13 may include a display and a drive circuit for driving the display.

The first operation reception unit 14 is a unit that receives an operation or an input by a user, and is realized, for example, by a physical button, a touch panel, a mouse, a keyboard, or the like. The first operation reception unit 14 as a touch panel may be realized as a function of the first display unit 13.

For example, the first storage unit 15 is a storage unit such as a hard disk drive, a solid state drive, and another memory. Part of the memory of the first control unit 11 may be regarded as the first storage unit 15. The first storage unit 15 may be regarded as part of the first control unit 11.

The first communication IF 16 is a generic term for one or a plurality of IFs for establishing communication to the outside of the device in a wired or wireless manner, in accordance with a prescribed communication protocol including a known communication standard provide.

The transport unit 17 is a unit that transports a document being a reading target along a predetermined transport path. For example, the transport unit 17 includes a roller that rotates to transport a document, a motor as a driving source for rotation, and the like. The transport unit 17 also includes a so-called Auto Document Feeder (ADF) function capable of sequentially transporting a plurality of documents one at a time, which are placed on a document tray.

The reading unit 18 is a unit that optically reads a document transported by the transport unit 17. The reading unit 18 includes a general configuration as a scanner, including a light source that irradiates a document, an image sensor that receives reflected light or transmitted light from a document, converts the light photoelectrically to generate an electrical signal as a result of reading, and outputs the electrical signal, an analog front end that converts the output from the image sensor to a digital signal to obtain image data, and the like.

The reading control device 20 is communicably connected to the image reading device 10. For example, the reading control device 20 is a terminal such as a personal computer, a server, a smartphone, and a tablet type terminal. The description for the first control unit 11, the CPU 11a, the ROM 11b, the RAM 11c, the first program 12, the first display unit 13, the first operation reception unit 14, the first storage unit 15, and the first communication IF 16 of the image reading device 10 is applied to the basic description for a second control unit 21, a CPU 21a, a ROM 21b, a RAM 21c, a second program 22, a second display unit 23, a second operation reception unit 24, a second storage unit 25, and a second communication IF 26 that are included in the reading control device 20. The second program 22 may be referred to as a driver or an application. In the example of FIG. 1, the image reading device 10 and the reading control device 20 are communicably connected to each other via the first communication IF 16 and the second communication IF 26.

Figure 2:
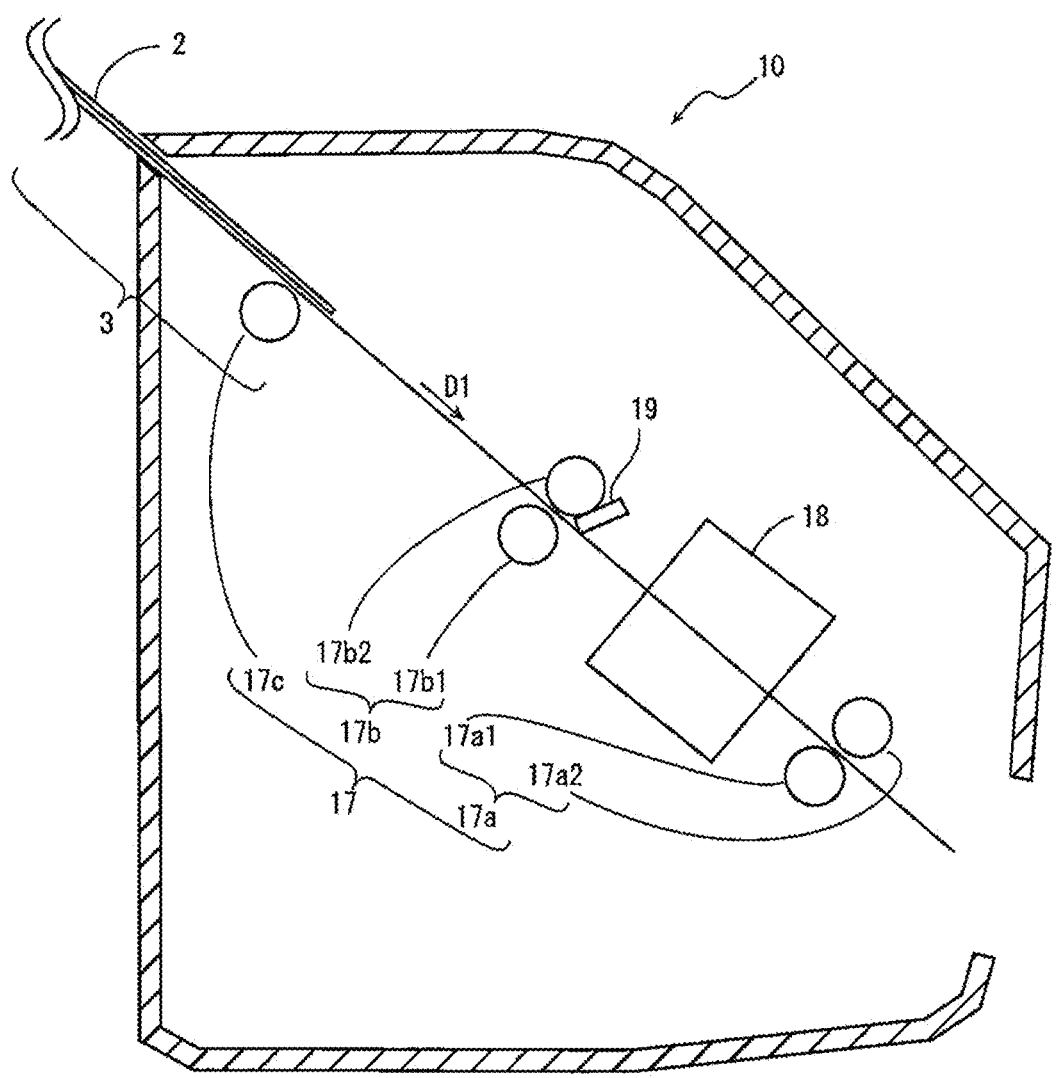
FIG. 2 is a diagram illustrating an internal configuration of an image reading device from a side viewpoint in a simplified manner.

FIG. 2 mainly illustrates an internal configuration of the image reading device 10 from a side viewpoint in a simplified manner. The image reading device 10 includes a placement unit 3 on which a document 2 is placed. The placement unit 3 is a document tray. The transport unit 17 transports the document 2 placed on the placement unit 3 in a predetermined transport path. Transport of the document 2 by the transport unit 17 corresponds to a "transport step". The transport unit 17 includes a sheet feeding roller pair 17b including rollers 17b1 and 17b2 that are arranged to face each other with the transport path therebetween and a sheet discharging roller pair 17a including rollers 17a1 and 17a2 that are similarly arranged to face each other. For example, the roller 17b1 and the roller 17a1 that are arranged on the lower side of the transport path are coupled to a motor, which is omitted in illustration, and are rotated by a driving force applied from the motor. The direction along the transport path is referred to as a transport direction D1.

Upstream and downstream in the transport direction D1 are simply referred to as upstream and downstream.

The sheet feeding roller pair 17b is arranged upstream of the reading unit 18, and transports the document 2 downstream. The sheet discharging roller pair 17a is arranged downstream of the reading unit 18, and transports the document 2 read by the reading unit 18 downstream to discharge the document 2. For example, a sensor 19 that detects an edge of the document 2 may be provided at a position in the vicinity of the sheet feeding roller pair 17b. At a position upstream of the sheet feeding roller pair 17b and close to the placement unit 3, a load roller 17c as a part of the transport unit 17 is provided. The load roller 17c guides the document 2 one at a time from the placement unit 3 into the transport path.

In the example of FIG. 2, the reading unit 18 is provided on the upper side and the lower side of the transport path to sandwich the transport path therebetween, and is capable of reading both the surfaces of the document 2 at the same time. In other words, the reading unit 18 reads the upper surface of the document 2 with an image sensor provided on the upper side of the transport path, and reads the lower surface of the document 2 with an image sensor provided on the lower side of the transport path. However, it is not necessarily required that the image reading device 10 be a product capable of reading both the surfaces of the document 2 at the same time. For example, the image reading device 10 may be a product in which the reading unit 18 reads a downward facing surface of the document 2 being transported with the image sensor provided on the lower side of the transport path, the transport unit 17 causes the document 2 to make a U-turn, eventually allowing the reading unit 18 to read both the surfaces of the document 2. One surface of the two surfaces of the document 2 may be referred to as a "first surface", and a surface opposite to the first surface may be referred to as a "second surface".

In the following description, the processing executed by each of the image reading device 10 and the reading control device 20 is described with reference to FIG. 3, FIG. 8, and the like. However, it is not required to understand division of the functions between the image reading device 10 and the reading control device 20 in a strict sense. The first control unit 11 and the second control unit 21 may be regarded as the control unit of the image reading system 1 without making particular distinction therebetween. For example, the processing in FIG. 8 described below while assuming that the processing is executed by the reading control device 20 may be executed by the image reading device 10. In other words, in actuality, the image reading system 1 may be completed within the image reading device 10. Alternatively, part of the processing in FIG. 3, for example, Step S120 to Step S140, which is described below as the processing executed by the image reading device 10, may be executed by the reading control device 20.

Not all the configurations in the drawings are necessary configurations in the present embodiment. For example, the display unit and the operation reception unit may be provided only one of the image reading device 10 or the reading control device 20. In the following description, the first display unit 13 and the second display unit 23 are simply referred to as the display unit without making distinction therebetween, and the first operation reception unit 14 and the second operation reception unit 24 are simply referred to as the operation reception unit without making distinction therebetween. Similarly, in some cases, the first storage unit 15 and the second storage unit 25 may be simply referred to as the storage unit without making distinction therebetween.

Further, the image reading device 10 may be a product including a reading function of a so-called flat-bed type, in which a document placed on a transparent document table is read by an image sensor.

2. PROCESSING FOR DETERMINING FAVORITE PAGE

Figure 3:
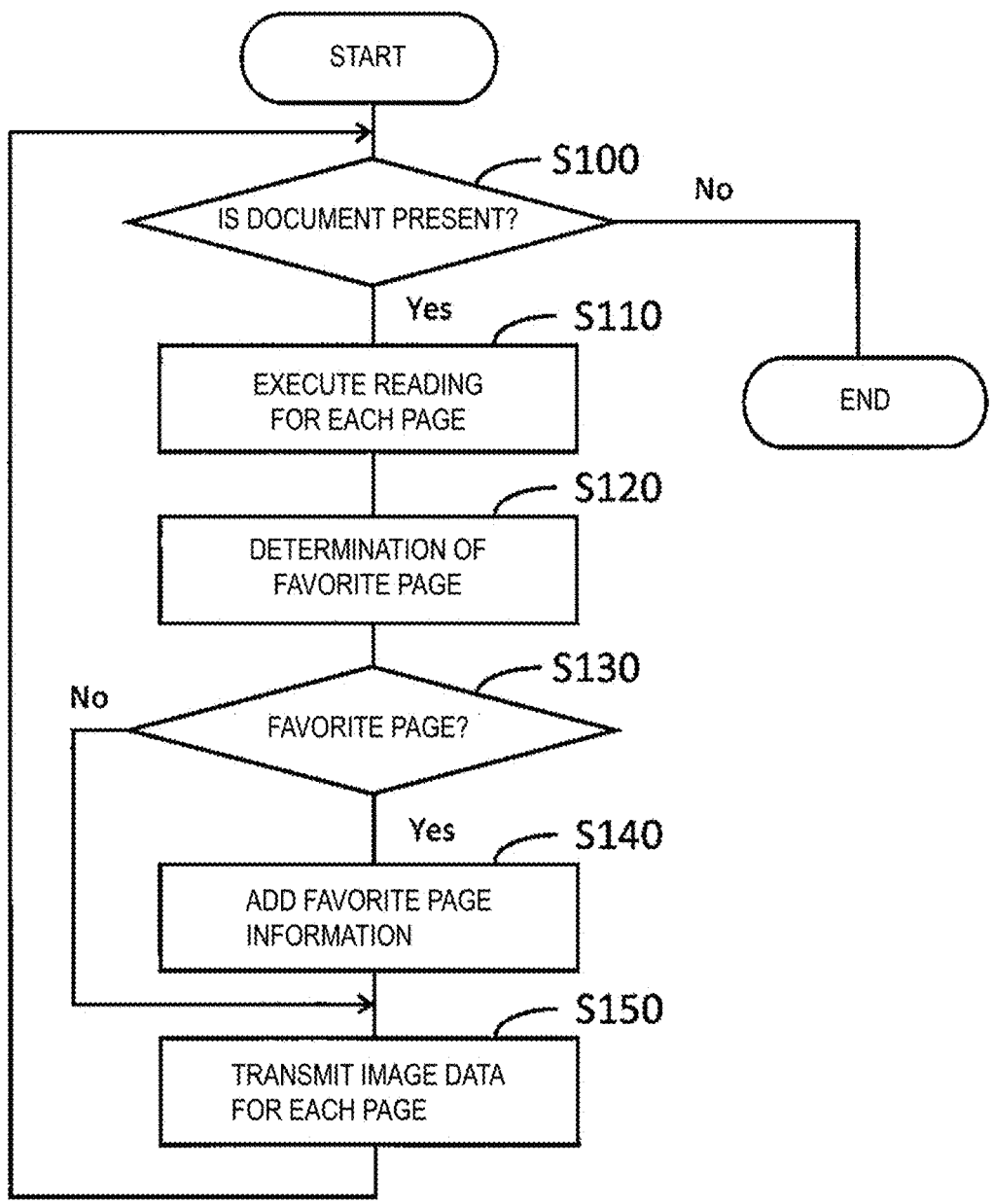
FIG. 3 is a flowchart illustrating image reading processing executed by the image reading device.

FIG. 3 illustrates, using a flowchart, the image file saving processing executed by the first control unit 11 of the image reading device 10 in accordance with the first program 12.

A user operates the operation reception unit to instruct the image reading device 10 to start scanning of the document 2. With the reception of the instruction for starting scanning as a trigger, the first control unit 11 starts the flowchart in FIG. 3.

In Step S100, the first control unit 11 determines presence or absence of the document 2. Although omitted in illustration, the image reading device 10 includes a sensor that detects placement of the document 2 on the placement unit 3, in the vicinity of the placement unit 3. Therefore, when the sensor currently detects the document 2, the first control unit 11 determines presence of the document, that is, "Yes" in Step S100, and the processing proceeds to Step S110. In contrast, when the sensor does not currently detect the document 2, the first control unit 11 determines absence of the document, that is, "No" in Step S100, and the flowchart in FIG. 3 is terminated.

In Step S110, the first control unit 11 causes the transport unit 17 to start the processing of transporting one document 2 from the placement unit 3, and causes the reading unit 18 to read the document 2 transported. For example, with the detection of the leading edge of the document 2, which faces downstream, by the sensor 19 illustrated in FIG. 2 as a trigger, the first control unit 11 may cause the reading unit 18 to start the reading operation. As a result, image data is generated as a result of reading the document 2 in a page unit. Step S110 corresponds to an "image data generation step".

In Step S120, the first control unit 11 determines whether the image data generated in Step S110 corresponds to a favorite page. In this case, the first control unit 11 determines whether a "predetermined entry" written by a user in the document 2 is present in the image data. When the predetermined entry is present in the image data, the image data corresponds to the favorite page. Step S120 and Step S130 correspond to a "determination step".

Before the specific description on Step S120 and Step S130, presetting for a "favorite mark" is described. The favorite mark corresponds to the predetermined entry. A user operates the operation reception unit to set the favorite mark in advance. In the flowchart in FIG. 3, it is assumed that setting for the favorite mark is done.

Figure 4:
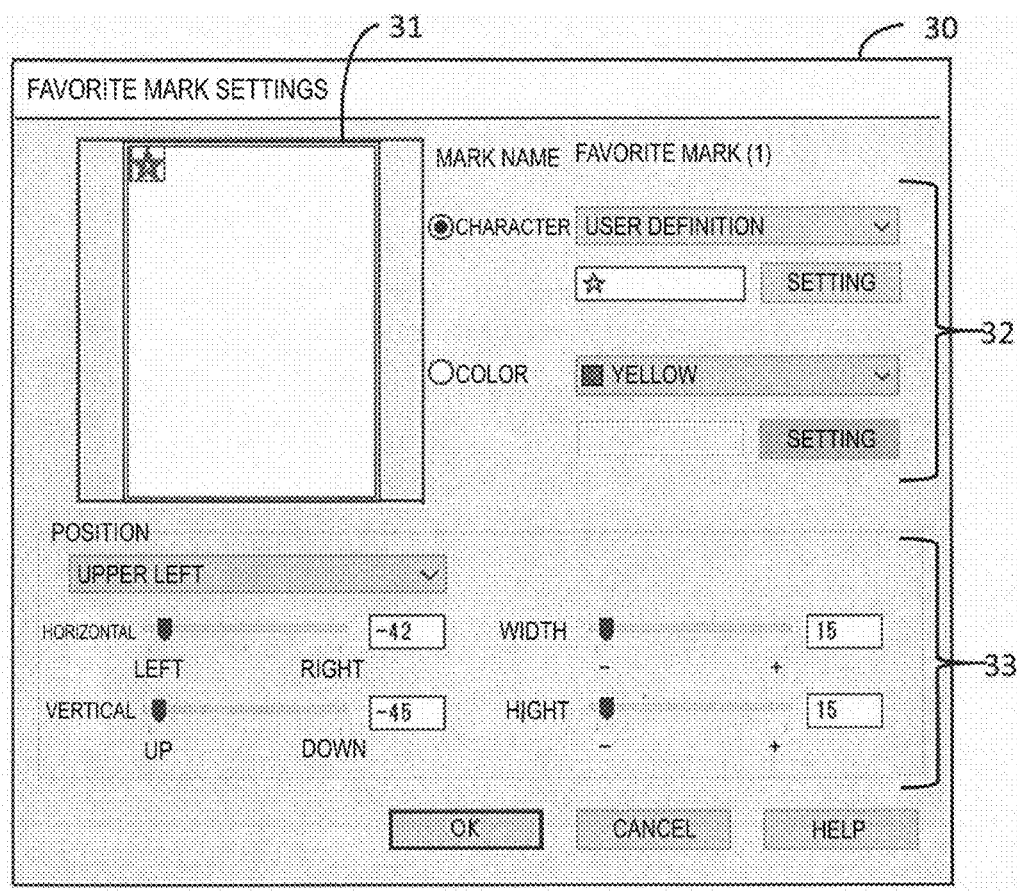
FIG. 4 is a diagram illustrating a UI screen for setting a favorite mark.

FIG. 4 illustrates a UI screen 30 for setting a favorite mark. The control unit causes the display unit to display the UI screen 30. UI is an abbreviation for user interface. The UI screen 30 includes a preview display section 31, a mode setting section 32, and a position/size setting section 33. As a matter of course, the design of the UI screen 30 is not limited to the illustrated design. The UI screen 30 may include various input sections in addition to the illustrated sections. Here, the mode indicates an exterior, appearance, and a design, specifically, a shape and a color. A user may set a character or a color of the favorite mark in a freely selective manner in the mode setting section 32. The "character" of the favorite mark inclusively indicates various symbols such as ○, Δ, □, and ☆, in addition to characters such as alphabets, kanji, hiragana, and katakana.

The mode setting section 32 provides a user in advance with a list of some choices for each of the character and the color, and receives a choice of the user from the list. Alternatively, the mode setting section 32 receives an instruction for the character or the color freely selected by a user. A user operates the mode setting section 32 as described above to set the character and the color of the favorite mark or set one of the character or the color of the favorite mark. For example, a user sets a "yellow star-shaped symbol ☆" as the favorite mark.

The position/size setting section 33 is a section in which a user sets information about a position or a size of the favorite mark in one page of the document. The position/size setting section 33 provides a user with a list of typical positional choices such as upper left, upper right, lower left, and lower right with regard to the position of the favorite mark, and receives a choice of the user from the list. Alternatively, the position/size setting section 33 receives, from a user, an instruction indicating information relating to horizontal and vertical coordinates. Similarly, the position/size setting section 33 is capable of receiving, from a user, a choice relating to a width being a horizontal size or a height being a vertical size of the favorite mark. Note that upper left, upper right, lower left, and lower right indicate an upper-left corner, an upper-right corner, a lower-left corner, and a lower-right corner of a surface read by the reading unit 18 when the edge of the surface facing downstream is regarded as an upper side and the edge of the surface facing upstream is regarded as a lower side.

A user operates the position/size setting section 33 as described above to set the position and the size of the favorite mark. However, a user is not required to set the position and the size of the favorite mark. For example, by setting the position to none in the position/size setting section 33, the position of the favorite mark can be left unset. Further, by setting the width and the height to predetermined maximum values in the position/size setting section 33, for example, the size of the favorite mark can be left unset in actuality.

The preview display section 31 displays a preview of the favorite mark with the current setting contents in the mode setting section 32 and the position/size setting section 33 reflected. A user can check the preview display section 31 to see what favorite mark the user has set. In the example of FIG. 4, a state in which a star-shaped mark is arranged at an upper-left position on one page of the document in the preview display section 31 is illustrated.

When a user performs a predetermined operation for confirming the setting for the favorite mark, the setting contents for the favorite mark that are input through the UI screen 30 are stored in the storage unit. The setting contents for the favorite mark that are stored in the storage unit as described above correspond to "entry information" that defines the predetermined entry. Further, reception of the setting for the favorite mark through the UI screen 30 in the image reading system 1 corresponds to a "information reception step".

A user may set a plurality of favorite marks. For example, in the example of FIG. 4, a state in which a "favorite mark 1" is set in the UI screen 30 is illustrated. The "favorite mark 1" is hereinafter referred to as a first favorite mark. A user may perform the operation to set a second favorite mark, a third favorite mark, and the like in a freely selective manner, in addition to the first favorite mark. For example, the plurality of favorite marks are set by setting a star-shaped mark on the upper left corner on the page as the first favorite mark and a square mark on the upper right on the page as the second favorite mark. The plurality of favorite marks such as the first favorite mark and the second favorite mark may be referred to as a "first entry" and a "second entry".

A user actually writes the favorite mark that is set through the UI screen 30 as described above in a favorite page of the plurality of documents 2 or a favorite part in the document 2. After that, the document 2 is set on the placement unit 3, and is read by the image reading device 10.

The Description Returns to Step S120.

The first control unit 11 reads the entry information stored in the storage unit, and determines whether the favorite mark is present in the image data, based on the entry information. For example, when the symbol and the position of the favorite mark are defined in the entry information, the first control unit 11 subjects a partial region including the position defined in the image data to image recognition processing such as pattern matching, thereby trying to extract a symbol having the same shape as the defined symbol. As a matter of course, when the size of the favorite mark is also defined in the entry information, extraction including size matching is tried. Note that, with regard to the shape, the size, and the color, which is described below, a matching degree or a similarity degree that falls within an acceptable range for determining sameness or conformity with the defined shape, size, and color is a matter of detection accuracy or a product design concept, and hence is not particularly referred herein.

Further, when the color and the position of the favorite mark are defined in the entry information, the first control unit 11 tries to extract the same color as the defined color from the partial region including the position defined in the image data. For example, the first control unit 11 generates a histogram being a color frequency distribution for the target region for which color extraction is tried, and specifies, from the histogram, a background color being the color of the document 2 itself and a color other than the background color. In many cases, the background color is white or a light color close to white. When the color other than the background color, which is specified from the histogram, is the same color as the defined color of the favorite mark, the color of the favorite mark is successfully extracted.

Note that, in a case in which the color of the document 2 is a color darker than white, when the color of the favorite mark in the image data overlaps with the background color, the color of the favorite mark is a color darker than the color of the favorite mark written by a user in the document 2. Thus, for example, the first control unit 11 may calculate a color obtained by subtracting the background color from the color other than the background color, which is specified as described above, and may determine whether the calculated color is the same color as the defined color of the favorite mark.

When the shape and/or the color that can be determined to be the same as that of the favorite mark can be extracted accordingly from the image data for a certain page, based on the entry information, the first control unit 11 determines that the favorite mark is present in the image data.

In Step S130, when the first control unit 11 determines that the favorite mark is present in the image data, in other words, the image data corresponds to the favorite page, the processing proceeds from the determination of "Yes" to Step S140. In contrast, when the first control unit 11 determines that the favorite mark is not present in the image data, in other words, the image data does not correspond to the favorite page, the processing proceeds from the determination of "No" to Step S150.

In Step S140, the first control unit 11 adds "favorite page information" indicating the favorite page to the image data corresponding to the favorite page, and the processing proceeds to Step S150. The favorite page information corresponds to "specification information" indicating presence of the predetermined entry. Step S140 corresponds to an "information addition step" for adding the specification information to the image data.

In Step S150, the first control unit 11 transmits the image data for each page to the reading control device 20 via the first communication IF 16. In this case, the image data to which the favorite page information is added is transmitted in a state in which the favorite page information is added thereto. The first control unit 11 returns to determination in Step S100 after Step S150. According to the flowchart in FIG. 3 described above, the cycle from Step S100 to Step S150 is repeated until the last one of the plurality of documents 2 placed on the placement unit 3 is transported, and the image data in a page unit is sequentially transmitted to the reading control device 20.

Note that the reading unit 18 reads the first surface and the second surface of the document 2 transported by the transport unit 17. Therefore, after the first control unit 11 determines "Yes" in Step S100 and until the processing returns to the determination in Step S100 again, that is, in Step S110 to Step S150, the image data for the first surface and the image data for the second surface of the document 2, in other words, the image data for two pages are generated and sequentially transmitted.

Figure 5:
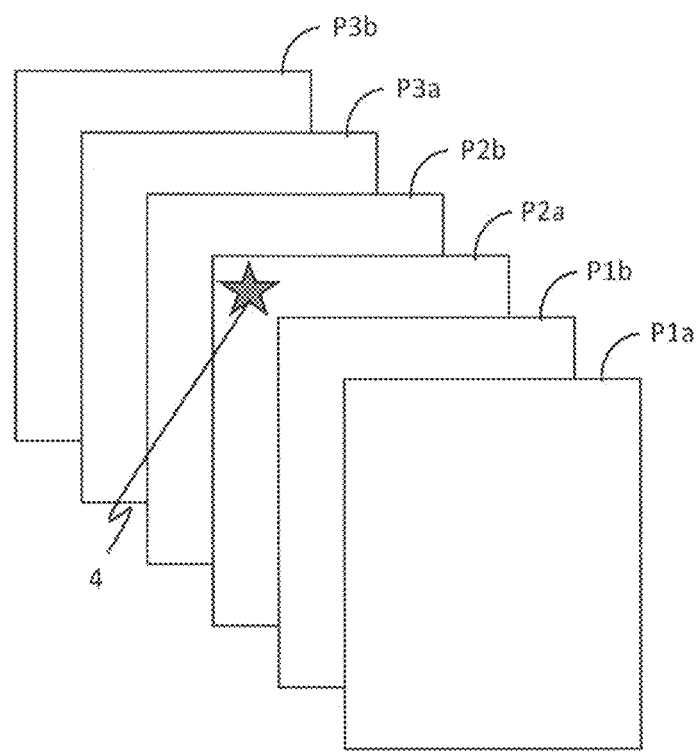
FIG. 5 is a diagram illustrating image data for a plurality of pages.

FIG. 5 illustrates image data P1*a*, P1*b*, P2*a*, P2*b*, P3*a*, and P3*b* for a plurality of pages that are generated as a result of reading the plurality of documents 2. Here, the image data P1*a* corresponds to the image data for the first surface of the document 2 that is read as the first document of the plurality of documents 2 placed on the placement unit 3. The image data P1*b* corresponds to the image data for the second surface of the first document 2. Similarly, the image data P2*a* corresponds to the image data for the first surface of the second document 2, the image data P2*b* corresponds to the image data for the second surface of the second document 2, the image data P3*a* corresponds to the image data for the first surface of the third document 2, and the image data P3*b* corresponds to the image data for the second surface of the third document 2.

The first surface of the document 2 is regarded as an odd-numbered page, and the second surface of the document 2 is regarded as an even-numbered page. With this, the image data P1*a*, P1*b*, P2*a*, P2*b*, P3*a*, and P3*b* correspond to a first page, a second page, a third page, a fourth page, a fifth page, and a sixth page, respectively. In the example of FIG. 5, on the upper left of the image data P2*a* corresponding to the third page, a star-shaped symbol 4 in a certain color is included. The symbol 4 is extracted as the favorite mark, based on the shape, the color, and the position. Thus, in the example of FIG. 5, the image data P2*a* of the image data P1*a*, P1*b*, P2*a*, P2*b*, P3*a*, and P3*b* is determined to be the favorite page in Step S120, the determination of "Yes" is given in Step S130, and the favorite page information is added in Step S140.

The flowchart in FIG. 3 is further described.

When the position of the favorite mark is not defined in the entry information, the first control unit 11 tries to extract the shape or the color of the favorite mark from the entire region in the image data in Step S120. Here, it is assumed that only the color of the favorite mark is defined in the entry information, and the position and the like are not defined. In such as case, in Step S120, the first control unit 11 vertically and horizontally divides the image data into a plurality of blocks, and determines whether each of the blocks has the same color as the color of the favorite mark. Then, a range in which the blocks having the same color as the color of the favorite mark are sequentially included is extracted as the favorite mark.

Figure 6:
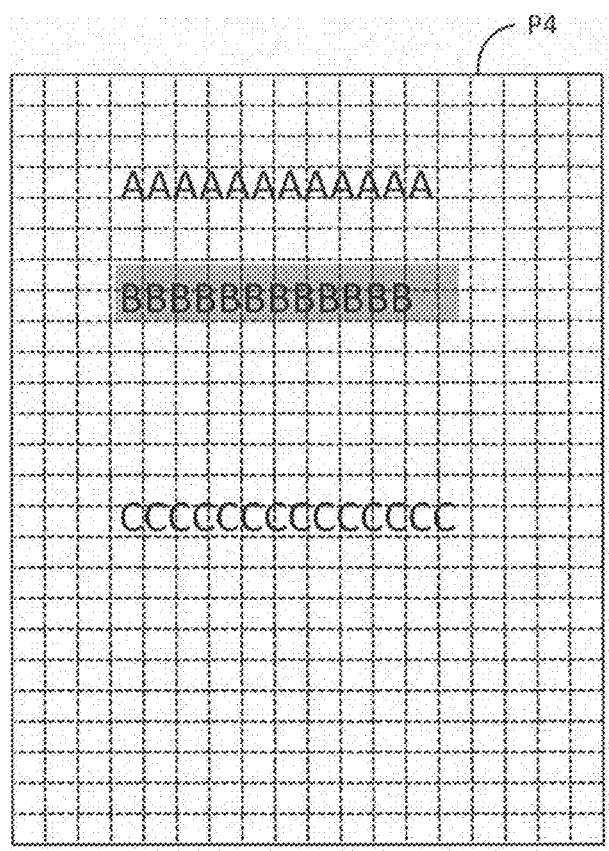
FIG. 6 is a diagram illustrating a state in which image data for one page is divided into a plurality of blocks.

FIG. 6 illustrates image data P4 for one page generated as a result of reading a certain document 2. Each rectangular shape sectioned by the broken line in the image data P4 is a block. The first control unit 11 generates a histogram for each block. By analyzing the histogram, the plurality of blocks can be categorized into a block having only the background color, a block having the background color and the color other than the background color, and a block having only the color other than the background color. Therefore, the first control unit 11 may specify a block that has the color other than the background color and has the same color as the color of the favorite mark, and may extract a range in which the specified blocks are sequentially included as the favorite mark.

A user who sets only a color for the favorite mark, writes the color in a freely selected favorite part in the document 2 with a pen or the like. In the example of FIG. 6, the image data P4 includes character strings, and a part "BBB . . . " of the character strings is painted with a color different from the background color. In other words, a user pays particular attention to the character string "BBB . . . " in the document 2, and hence writes the color as the favorite mark in the character string "BBB . . . ". In the example of FIG. 6, each of the blocks including the character string "BBB . . . " in the image data P4 is specified as the block having the same color as the color of the favorite mark, and the range in which such blocks including the character string "BBB . . . " are sequentially included is extracted as the favorite mark. Thus, in the example of FIG. 6, the image data P4 is determined to be the favorite page in Step S120, the determination of "Yes" is given in Step S130, and the favorite page information is added in Step S140.

Further, in many cases, a page number is originally printed on the document 2. A periphery of the position at which such a page number is printed is easily recognized as a position at which a user writes the favorite mark. However, in many cases, the position of the page number differs. For example, in the document 2, the position of the page number is on the lower right on the odd-numbered page, and is on the lower left on the even-numbered page. As described above, a plurality of favorite marks can be set. In view of this, for example, at the time of operating the UI screen 30 to set the favorite mark, a user sets a certain color as the favorite mark on the odd-numbered page and sets the position thereof on the lower right in the page, and sets a certain color as the favorite mark on the even-numbered page and sets the position thereof on the lower left in the page, in some cases. In other words, in the present embodiment, it can be assumed an example in which the entry information includes position information for the predetermined entry in the document 2, and the position information defines each of the position of the predetermined entry at the first surface of the document 2 and the position of the predetermined entry at the second surface of the document 2.

Figure 7:
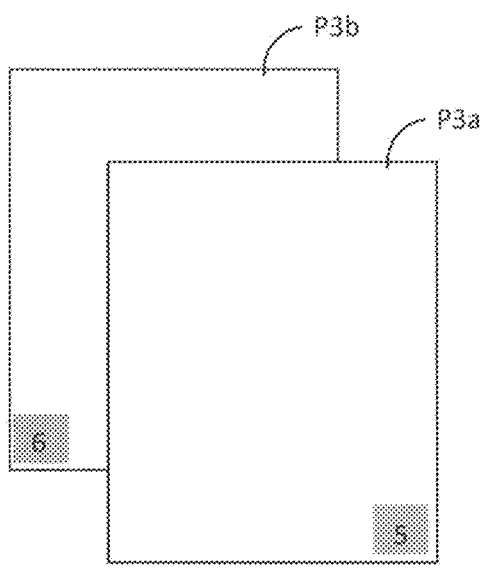
FIG. 7 is a diagram illustrating image data for two pages.

FIG. 7 illustrates the image data P3a and P3b for two pages that are generated as a result of reading a certain document 2. In FIG. 7, as described in FIG. 5, it is assumed that the image data P3a corresponds to the image data for the first surface of the third document 2 and the image data P3b corresponds to the image data for the second surface of the third document 2. The image data P3a corresponds to an odd-numbered page, and the image data P3b corresponds to an even-numbered page. In the example of FIG. 7, a page number "5" is included on the lower right in the image data P3a, and the page number "5" and the periphery thereof are painted with a color different from the background color. Similarly, a character of a page number "6" is included on the lower left in the image data P3b, and the page number "6" and the periphery thereof are painted with a color different from the background color.

In other words, a user pays particular attention to surfaces of the document 2 that correspond to the fifth page and the sixth page among the plurality of documents 2, and hence writes the color as the favorite mark in the page numbers on the fifth page and the sixth page with a pen or the like. The first control unit 11 performs determination for the image data P3a in Step S120, based on each of the setting for the favorite mark on the odd-numbered pages and the setting for the favorite mark on the even-numbered pages by a user. In the example of FIG. 7, in the image data P3a, a partial region including the page number "5" on the lower right in the page has the same color as the color of the favorite mark. Thus, the first control unit 11 is capable of extracting the partial region as the favorite mark with reference to the setting for the favorite mark on the odd-numbered pages. Similarly, the first control unit 11 performs determination for the image data P3b in Step S120, based on each of the setting for the favorite mark on the odd-numbered pages and the setting for the favorite mark on the even-numbered pages by a user. In the example of FIG. 7, in the image data P3b, a partial region including the page number "6" on the lower left in the page has the same color as the color of the favorite mark. Thus, the first control unit 11 is capable of extracting the partial region as the favorite mark with reference to the setting for the favorite mark on the even-numbered pages. Thus, in the example of FIG. 7, both the image data P3a and P3b are determined to be the favorite pages in Step S120, the determination of "Yes" is given in Step S130, and the favorite page information is added in Step S140.

3. FILE SAVING PROCESSING FOR FAVORITE PAGE

Figure 8:
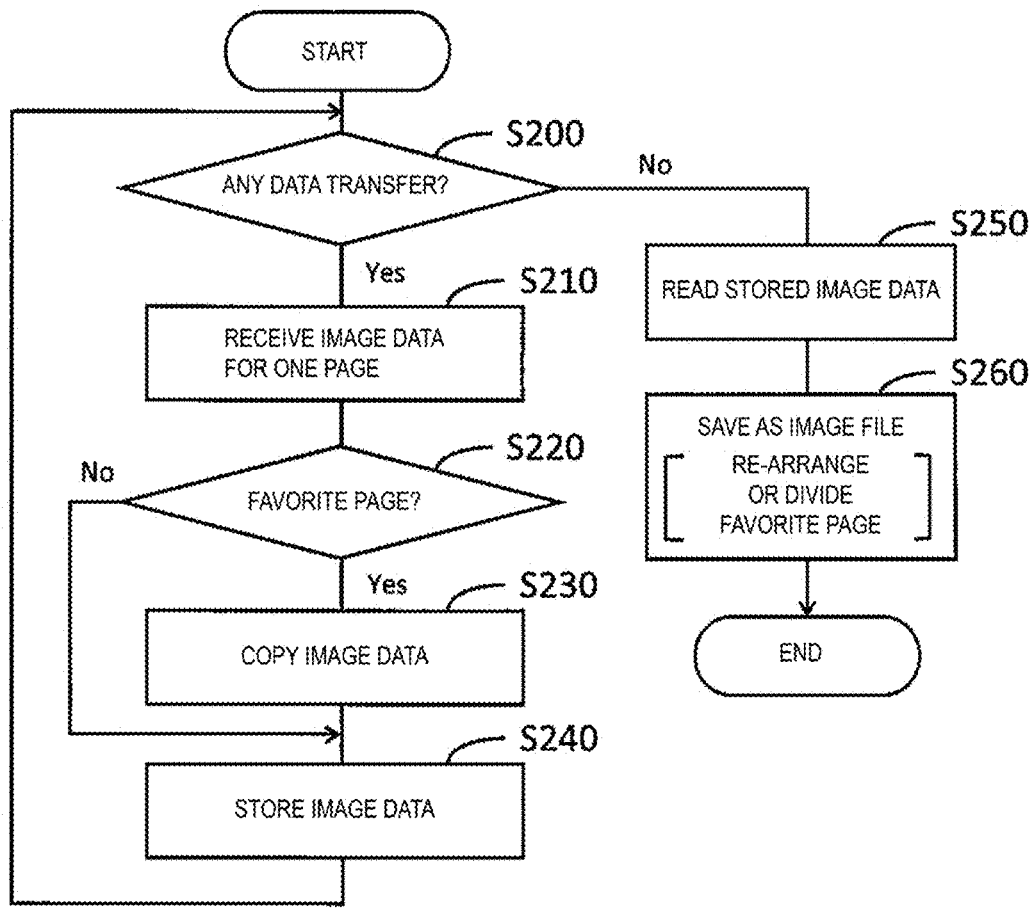
FIG. 8 is a flowchart illustrating image file saving processing executed by a reading control device.

FIG. 8 illustrates, using a flowchart, the image file saving processing executed by the second control unit 21 of the reading control device 20 in accordance with the second program 22.

In Step S200, the second control unit 21 determines presence or absence of data transfer from the image reading device 10. When data transfer is performed, the processing proceeds from the determination of "Yes" to Step S210. When data transfer is no performed, the processing proceeds from the determination of "No" to Step S250.

As understood from the description in FIG. 3, the image data in a page unit is sequentially transmitted from the image reading device 10 to the reading control device 20. Thus, the second control unit 21 may determine "Yes" in Step S200 while the second communication IF 26 detects such transmission of the image data from the image reading device 10, and may determine "No" in Step S200 when the second communication IF 26 detects that transmission of the image data from the image reading device 10 is stopped.

In Step S210, the second control unit 21 receives the image data for one page that is transmitted from the image reading device 10.

In Step S220, the second control unit 21 determines whether the image data for one page that is received by Step S210 corresponds to the favorite page. In other words, the image data to which the favorite page information is added is determined to be the favorite page, and the processing proceeds from "Yes" in Step S220 to Step S230. When the favorite page information is not added to the image data, the image data is not determined to be the favorite page, and the processing proceeds from "No" in Step S220 to Step S240.

In Step S230, the second control unit 21 copies the image data corresponding to the favorite page, and the processing proceeds to Step S240.

In Step S240, the second control unit 21 stores the image data for one page that is received in Step S210, in the storage unit, and the processing returns to determination in Step S200. As a matter of course, the image data after Step S230, including the image data replicated through copying, is stored.

In this manner, after the determination of "Yes" in Step S200, the second control unit 21 repeats Step S210 to Step S240 until determination of "No" in Step S200.

In Step S250, the second control unit 21 reads the image data that is stored in the storage unit in Step S240, and stores the read image data as an image file in Step S260. Step S260 corresponds to an "image storage step" for generating and storing an image file. Step S260 is broadly categorized into one of a "favorite page re-arrangement mode" or a "favorite page division mode". Which mode is to be executed is instructed in advance by a user via the operation reception unit, and the second control unit 21 may execute the mode according to the instruction. When Step S260 is terminated, the flowchart in FIG. 8 is terminated.

The favorite page re-arrangement mode is described.

Figure 9:
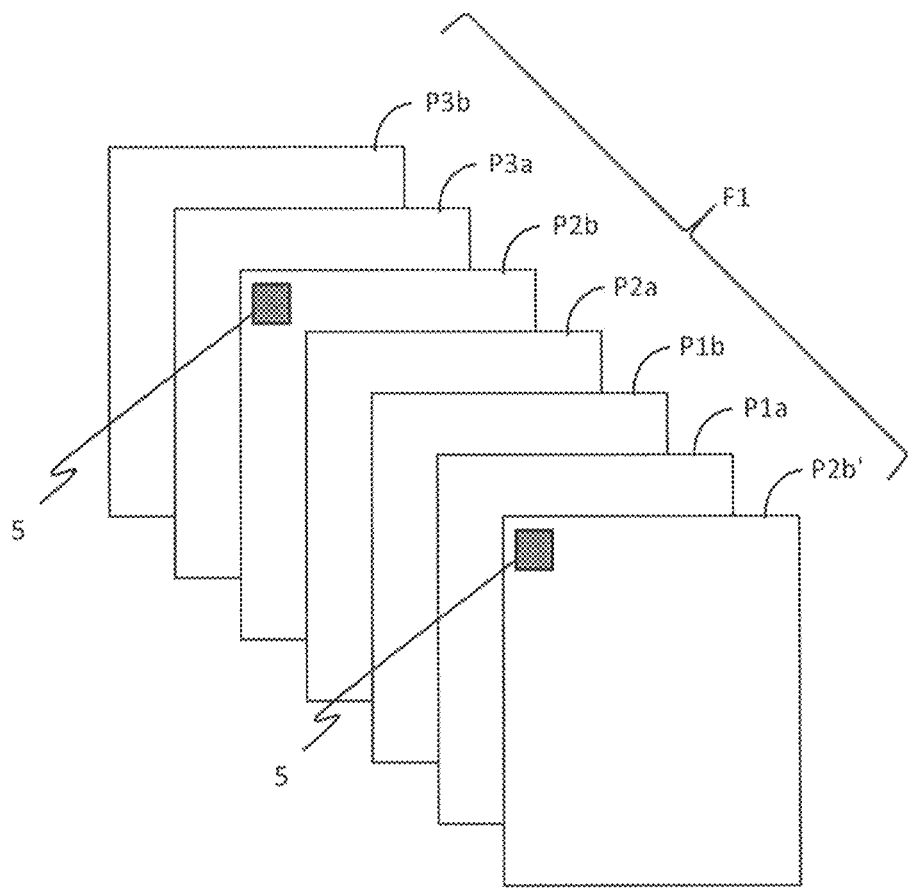
FIG. 9 is a diagram for describing a favorite page re-arrangement mode.

FIG. 9 is a diagram for describing the favorite page re-arrangement mode, and illustrates, as in FIG. 5, the image data P1a, P1b, P2a, P2b, P3a, and P3b for the plurality of pages that are generated as a result of reading the plurality of documents 2. In the example of FIG. 9, there is illustrated a case in which the image data P2b for the fourth page includes the symbol 5 having a rectangular shape, the symbol 5 is determined to be the favorite mark, and the image data P2b is recognized as the favorite page.

In this situation, in Step S260, the second control unit 21 that executes image file saving in the favorite page re-arrangement mode inserts image data P2b' being copy data of the image data P2b corresponding to the favorite page, at a position of a top page of the image data for all the documents read by the reading unit 18. Subsequently, one image file F1 is generated by combining the inserted image data P2b' and the image data for all the documents, and the image file F1 is stored in the storage unit. The image data P2b' is data generated by copying the image data P2b in S230, and hence the image data P2b' can be regarded exactly as the image data corresponding to the favorite page.

The "image data for all the documents" that are read by the reading unit 18 is a result of reading all the documents 2 that are collectively placed on the placement unit 3 by a user, specifically, the entire image data generated by the image reading device 10 during a period from the determination of "Yes" to determination of "No" in Step S100 in FIG. 3. In the example of FIG. 9, the image data P1a, P1b, P2a, P2b, P3a, and P3b correspond to the image data for all the documents.

Examples of a format of the image file generated in Step S260 may include, but are particularly limited to, various formats such as Joint Photographic Experts Group (JPEG), Tag Image File Format (TIFF), and Portable Document Format (PDF). According to FIG. 9, the image data P2b' corresponding to the favorite page is the top, that is, the first page in the image file F1, and the image data P1a corresponding to the first page before execution of Step S260 is changed to the second page in the image file F1. However, in image file saving in the favorite page re-arrangement mode, the position at which the image data P2b' corresponding to the favorite page is inserted may be a position of an end page, that is, a position after the image data P3b, instead of the top page of the image data P1a, P1b, P2a, P2b, P3a, and P3b for all the documents.

Further, in image file saving in the favorite page re-arrangement mode, when the image data P2b' corresponding to the favorite page is inserted with respect to the image data P1a, P1b, P2a, P2b, P3a, and P3b for all the documents, the second control unit 21 may secure a cover page in the image file. The cover page referred to herein is, in the example of FIG. 9, the image data P1a corresponding to the original first page, and the second control unit 21 may save an image file with the image data P2b' corresponding to the favorite page inserted at a position after the second page and with the image data P1a maintained as the top page. With this, a request from a user who prefers to have the image on the original first page as the cover page can be fulfilled.

As described above, a user may set the plurality of favorite marks in advance by operating the UI screen 30. When the plurality of favorite marks are set, a user may set an order of priority among the favorite marks by operating the UI screen 30. For example, it is assumed that a user sets the first favorite mark and the second favorite mark, and sets the priority of the first favorite mark higher than that of the second favorite mark. In the entry information being the setting contents for the favorite mark by a user, information indicating the order of priority among such favorite marks is also included and is stored. In this manner, in the information reception step, the entry information relating to each of the plurality of predetermined entries is received, and the entry information includes the information indicating the order of priority among the plurality of predetermined entries.

As described above, in Step S140 in FIG. 3, the first control unit 11 adds the favorite page information to the image data corresponding to the favorite page. When the plurality of favorite marks are set, the favorite page information may be information that not only simply indicates the favorite page but also specifies the favorite mark. In other words, the first control unit 11 adds, to the image data including the first favorite mark, the favorite page information indicating that the first favorite mark is included. Similarly, the first control unit 11 adds, to the image data including the second favorite mark, the favorite page information indicating that the second favorite mark is included.

Figure 10:
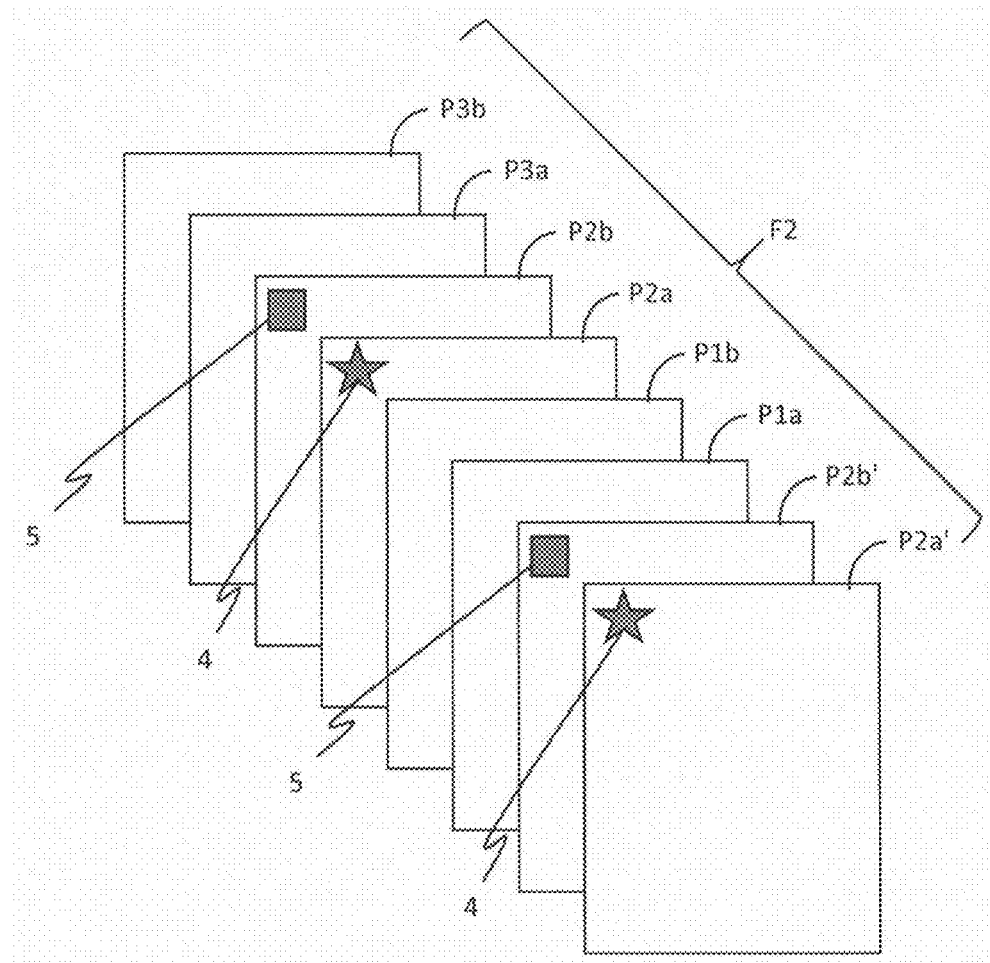
FIG. 10 is a diagram for describing another example of the favorite page re-arrangement mode.

FIG. 10 is a diagram for describing another example of the favorite page re-arrangement mode. For FIG. 10, the differences from FIG. 9 are described. In the example of FIG. 10, the image data P2b for the fourth page includes the symbol 5 having a rectangular shape, and the image data P2a for the third page includes the symbol 4 having a star-like shape. In FIG. 10, it is assumed that the symbol 4 and the symbol 5 correspond to the first favorite mark and the second favorite mark, respectively, and the first favorite mark has a higher priority than that of the second favorite mark.

In this situation, in Step S260, the second control unit 21 inserts the image data P2a' generated by copying the image data P2a corresponding to the favorite page and the image data P2b' generated by copying the image data P2b corresponding to the favorite page, at a position of the top page of the image data for all the documents. In this case, with reference to the entry information stored in advance in the storage unit and the favorite page information added to the image data, the second control unit 21 recognizes that the image data P2a' including the first favorite mark has a higher priority than that of the image data P2b' including the second favorite mark. In view of this, as illustrated in FIG. 10, the second control unit 21 arranges the image data P2a' with a higher priority on the top page side with respect to the image data P2b', combines the image data P2a' and P2b' and the image data for all the documents into one image file F2, and stores the image file F2 in the storage unit. In this manner, in the favorite page re-arrangement mode, one image file as a whole can be generated in which the favorite page with a higher priority is arranged on the top page side.

Next, the favorite page division mode is described.

Figure 11:
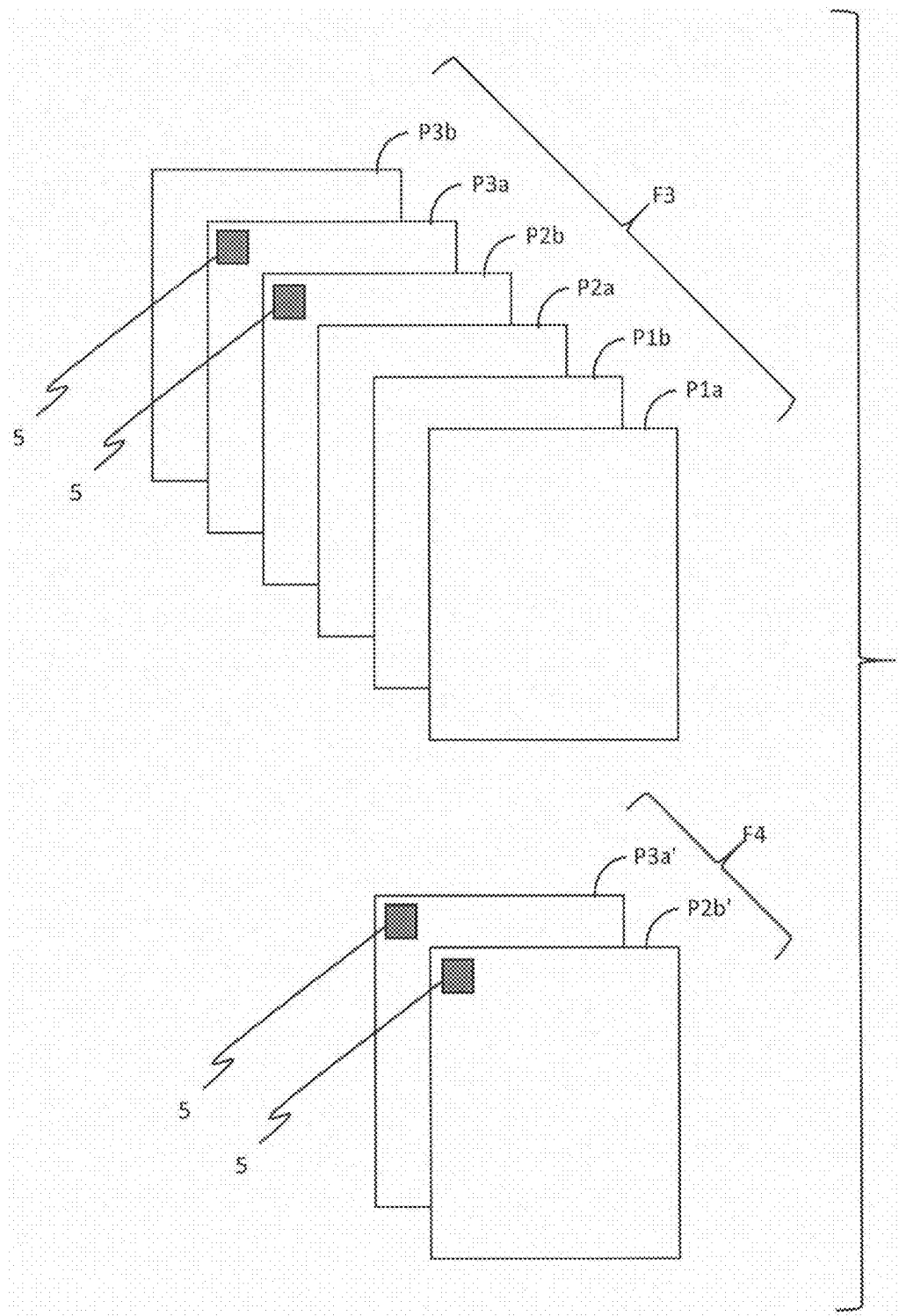
FIG. 11 is a diagram for describing a favorite page division mode.

FIG. 11 is a diagram for describing the favorite page division mode, and illustrates, as in FIG. 5, the image data P1a, P1b, P2a, P2b, P3a, and P3b for the plurality of pages that are generated as a result of reading the plurality of documents 2. In the example of FIG. 11, there is illustrated a case in which the symbol 5 having a rectangular shape is included in each of the image data P2b for the fourth page and the image data P3a for the fifth page, the symbol 5 is determined to be the favorite mark, and the image data P2b and P3a are recognized as the favorite pages.

In this situation, in Step S260, the second control unit 21 that executes image file saving in the favorite page division mode generates the image data P2b' being copy data of the image data P2b corresponding to the favorite page and image data P3a' being copy data of the image data P3a corresponding to the favorite page, as an image file F4 separate from the image data for all the documents. Further, the image file F4 combining the image data P2b' and P3a' and an image file F3 combining the image data P1a, P1b, P2a, P2b, P3a, and P3b for all the documents are each stored in the storage unit.

Figure 12:
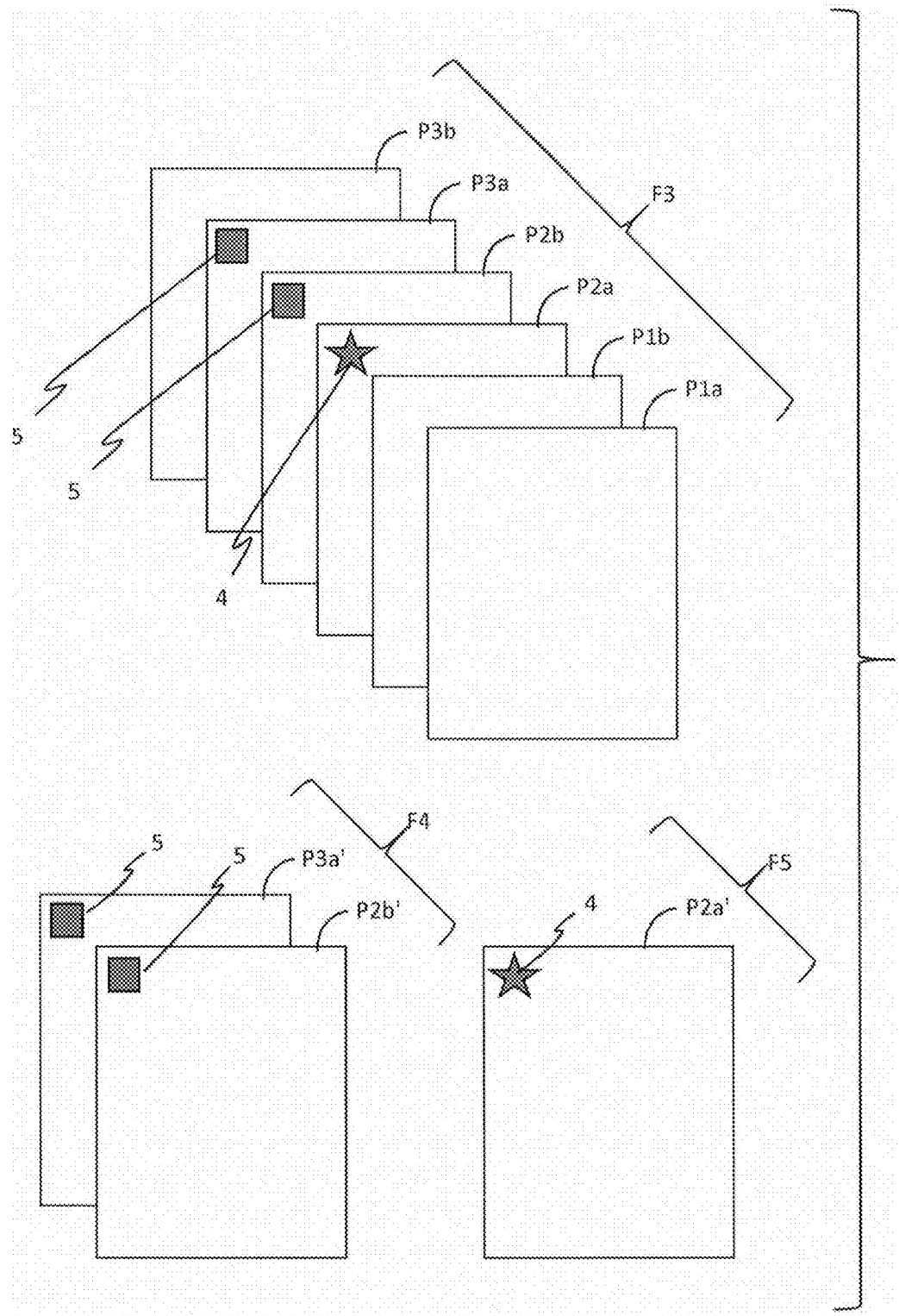
FIG. 12 is a diagram for describing another example of the favorite page division mode.

FIG. 12 is a diagram for describing another example of the favorite page division mode.

As described above, when the plurality of favorite marks are set, the first control unit 11 determines whether each of the plurality of favorite marks including the first entry and the second entry is present in the image data in Step S120 in FIG. 3. Thus, in Step S260, the second control unit 21 that executes image file saving in the favorite page division mode may store the image data to which the favorite page information indicating presence of the first entry is added and the image data to which the favorite page information indicating presence of the second entry is added, each as a separate image file.

For FIG. 12, the differences from FIG. 11 are described. In the example of FIG. 12, the image data P2b and P3a for the fourth page and the fifth page include the symbol 5 having a rectangular shape, and the image data P2a for the third page includes the symbol 4 having a star-like shape. In FIG. 12, as in FIG. 10, it is assumed that the symbol 4 and the symbol 5 correspond to the first favorite mark and the second favorite mark, respectively, and the first favorite mark has a higher priority than that of the second favorite mark.

In this situation, in Step S260, as in the description in FIG. 11, the second control unit 21 generates the image file F3 and the image file F4, and generates the image data P2a' generated by copying the image data P2a corresponding to the favorite page including the favorite mark different from those in the image data P2b and P3a, as one image file F5. Subsequently, those three image files F3, F4, and F5 are stored in the storage unit.

In another example, in Step S260, the second control unit 21 that executes image file saving in the favorite page division mode may save only the image data corresponding to the favorite page with a higher priority, as an image file separate from the image data for all the documents. With reference to the example of FIG. 12, the image data P2a corresponding to the favorite page has a higher priority than those of the image data P2b and P3a corresponding to the favorite pages. In view of this, the second control unit 21 may generate and store only the image files F3 and F5 of those three image files F3, F4, and F5.

In the favorite page division mode, the second control unit 21 may also add the cover page as the top page in the image file F4 or the image file F5, other than the image file F3 combining the image data for all the documents. As described above, the cover page corresponds to the image data P1a for the original first page. When the plurality of divided image files F3, F4, and F5 are provided with a commonly shared cover page, a user can easily recognize a relation of the image files F3, F4, and F5.

In the favorite page division mode, the second control unit 21 may delete the image data for all the documents. In other words, when an instruction for storing only the image file for the favorite page is received in advance from a user, the second control unit 21 does not delete but keeps the image files F4 and F5 corresponding to the favorite pages, and deletes, from the storage unit, the image data P1a, P1b, P2a, P2b, P3a, and P3b corresponding to the image file F3, which are illustrated in FIG. 11 and FIG. 12.

As an embodiment that is shared in the two modes described above, the second control unit 21 may execute a "deletion step" for deleting the favorite mark from the image data corresponding to the favorite page. The favorite mark is information that is less important at the stage of keeping the image of the document 2 as the image file, and hence the favorite mark is deleted. For a method of deleting the favorite mark, the color in pixels corresponding to the favorite mark in the image data may be replaced with the background color.

For example, in the favorite page re-arrangement mode, all the favorite marks (symbols 5) are deleted in the process of generating the image file F1 illustrated in FIG. 9, or all the favorite marks (symbols 4 and 5) are deleted in the process of generating the image file F2 illustrated in FIG. 10. However, instead of deleting all favorite marks, the favorite marks may remain in one of the image data P2a and P2b before copying or the image data P2a' and P2b' after copying, according to a request from a user.

Further, in the favorite page division mode, all the favorite marks (symbols 5) are deleted in the process of generating the image files F3 and F4 illustrated in FIG. 11, or all the favorite marks (symbols 4 and 5) are deleted in the process of generating the image files F3, F4, and F5 illustrated in FIG. 12. However, the favorite marks may not be deleted but may remain in one of the image data P2a, P2b, and P3a before copying or the image data P2a', P2b', and P3a' after copying, according to a request from a user.

Further, the timing at which the favorite mark deletion step is executed may be after the timing at which the favorite mark is no longer required, due to the processing in the present embodiment. The favorite mark is information required in Step S120 in FIG. 3. For example, at a timing after the first control unit 11 adds the favorite page information to the image data in Step S140 and before the first control unit 11 transmits the image data in Step S150, the favorite mark may be deleted from the image data including the favorite mark.

4. MODIFICATION EXAMPLE

Figure 13:
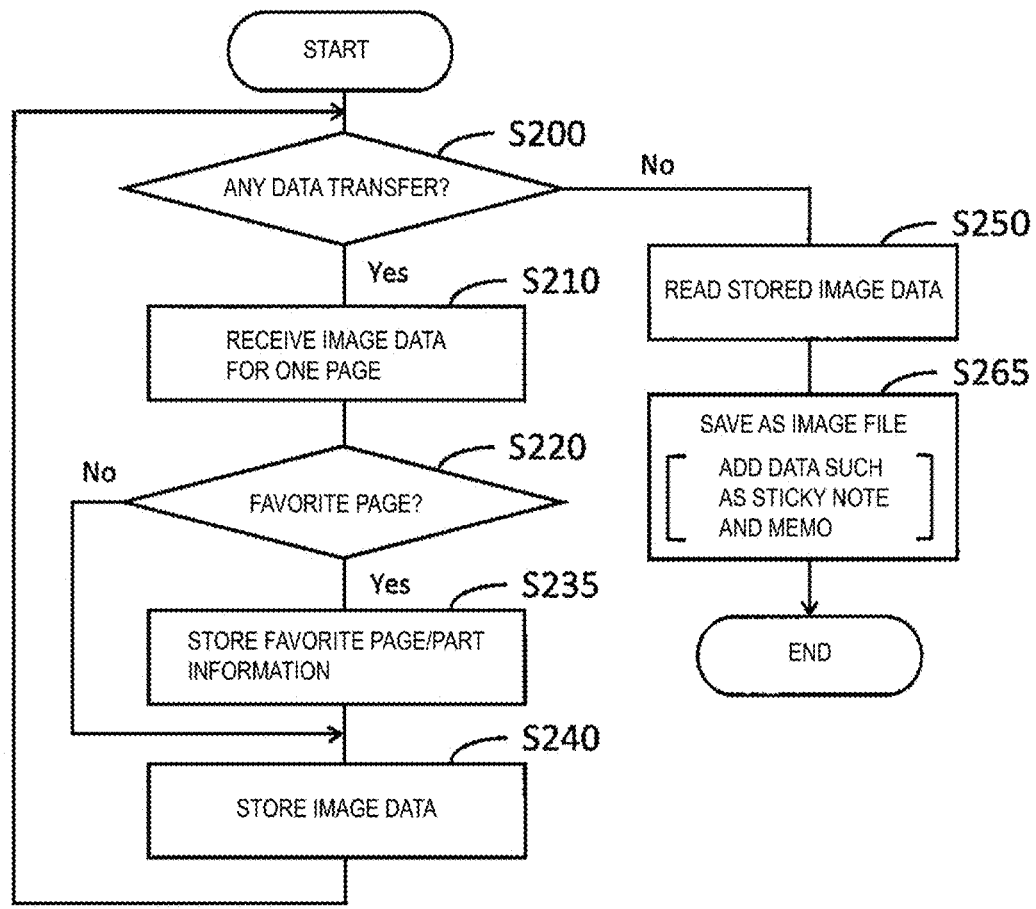
FIG. 13 is a flowchart illustrating image file saving processing in a modification example.

FIG. 13 illustrates, using a flowchart, image file saving processing in a modification example. As an assumption in the modification example, the image reading system 1 generates an image file in a format of PDF or the like that supports a function of adding character information to an image, such as a so-called sticky note function and a memo function, or a highlighting function of displaying a part of the image in a highlighted manner. The sticky note function and the memo function are also referred to as a note function and a comment function.

For FIG. 13, the differences from the flowchart in FIG. 8 are mainly described. The second control unit 21 causes the processing to proceed from "Yes" in Step S220 to Step S240 via Step S235. In Step S235, the second control unit 21 stores favorite page/part information in the storage unit. The favorite page/part information is the information indicating the page number of the image data corresponding to the favorite page and the position information for the favorite mark in the image data corresponding to the favorite page. In the modification example, it is assumed that, in the favorite page information added to the image data in Step S140, the position information includes the coordinates of the favorite mark in the image data, in addition to the information indicating the image data corresponds to the favorite page.

Specifically, as described with reference to FIG. 6, when a favorite mark in a color whose position is not defined in the entry information is extracted from the image data, the coordinates of the favorite mark in the color are included as the position information in the favorite page information in Step S140. Therefore, in Step S235, the second control unit 21 may store the position information included in the favorite page information added to the image data, as one piece of the favorite page/part information.

In Step S265, the second control unit 21 combines the image data in a page unit received in Step S210 during a period from the determination of "Yes" in Step S200 until the determination of "No" in Step S200 into one file, and saves the one file as an image file in the above-mentioned format such as PDF. In this case, with reference to the favorite page/part information stored in Step S235, the second control unit 21 subjects the image data corresponding to the favorite page of the image data for the plurality of page to the sticky note function for adding predetermined character string data or to the highlighting function for displaying the position of the favorite mark in the image data corresponding to the favorite page in a highlighted manner.

The character string data referred to herein is a character string that is registered in association with the favorite mark in the image reading system 1 by a user. A content of the character string is freely selected by a user. According to this configuration, predetermined character string data can be added in the favorite page in the image file in a visually recognizable manner. Further, for the color to be used for highlighting in the highlighting function, the second control unit 21 may use the color that is set as the color of the favorite mark as is. According to this configuration, the favorite part in the image file is displayed in a highlighted manner with the same color as the color written in the document 2 by a user with a pen or the like.

5. CONCLUSION

As described above, according to the present embodiment, the method of producing image data includes the image data generation step of reading the document 2 by the reading unit 18 and generating the image data as a result of reading the document 2, the determination step of determining whether the predetermined entry written by a user in the document 2 is present in the image data, and the information addition step of adding the specification information indicating presence of the predetermined entry, to the image data in which the predetermined entry is determined to be present in the determination step.

With the configuration described above, in the method of producing image data, the specification information is added to the image data in which the predetermined entry written by a user in the document 2 is determined to be present. Thus, the information indicating a favorite page or part of a user can be stored accurately in the result of reading, and can be utilized in the subsequent processing. Further, in JP-A-2012-156964 described above, the user is required to leave a crease at a favorite page of a document before causing the image reading device to read the document. In the present embodiment, however, such a crease is not required, and a user's request for digitizing documents without leaving a crease in the documents can be fulfilled.

Further, according to the present embodiment, the method of producing image data includes the transport step of transporting the document 2. In the image data generation step, the reading unit 18 reads the document 2 transported.

According to JP-A-2012-156964 described above, a document needs to have a crease. When a document with a turned-down corner is transported, a paper jam is likely to occur. In the present embodiment, the document 2 does not need to have a crease. Thus, a paper jam is less likely to occur, and the document 2 can be efficiently read by a sheet-feeding method.

Further, according to the present embodiment, the method of producing image data includes the image storage step of storing the image data to which the specification information is added, as the image file separate from the image data for all documents read by the reading unit 18.

With the configuration described above, it is possible to fulfill a user's request to obtain the image data for the favorite document 2 having the predetermined entry written therein as a file separate from the image data for all the documents including the other documents 2. Thus, convenience for a user can be improved.

Further, according to the present embodiment, in the determination step, whether each of a first entry and a second entry as the predetermined entries is present in the image data may be determined. In the image storage step, the image data to which the specification information indicating presence of the first entry is added and the image data to which the specification information indicating presence of the second entry is added may be each stored as a separate image file.

With the configuration described above, it is possible to fulfill a user's request to use the predetermined entries according to the difference in degree of importance among the documents 2 and store the image data for the documents 2 in separate files.

Further, according to the present embodiment, in the image storage step, the image data to which the specification information is added may be stored as the image file separate from the image data for all the documents read by the reading unit 18, and the image data for all the documents may be deleted.

With the configuration described above, it is possible to fulfill a user's request to store, as an image file, only the image data for the favorite document 2 in which the predetermined entry is written, and storage region consumption can be saved.

Further, according to the present embodiment, the method of producing image data includes the image storage step of inserting the image data to which the specification information is added, at a position of the top page or a position of the end page of the image data for all the documents read by the reading unit 18, and storing the image data inserted and the image data for all the documents read by the reading unit 18 collectively as one image file.

With the configuration described above, it is possible to fulfill a user's request to arrange the image data for the favorite document 2 in which the predetermined entry is written, at an easily recognizable position such as the top page or the end page, and obtain all the results of reading the other documents 2 as one file.

Further, according to the present embodiment, the method of producing image data includes the information reception step of receiving, from a user, the entry information defining the predetermined entry, and in the determination step, whether the predetermined entry is present in the image data is determined based on the entry information.

With the configuration described above, a user can define the predetermined entry in a freely selective manner, and convenience for a user who actually performs writing in the document 2 can be improved.

Further, according to the present embodiment, the entry information may include the position information for the predetermined entry in the document 2, and the position information may define each of the position of the predetermined entry at the first surface of the document 2 and the position of the predetermined entry at the second surface being the surface opposite to the first surface of the document 2.

With the configuration described above, even when the position at which a user writes the predetermined entry differs between the first surface and the second surface, in other words, between the front surface and the back surface of the document 2, presence or absence of the predetermined entry can be determined to be appropriate for each of the first surface and the second surface.

Further, according to the present embodiment, in the information reception step, the entry information relating to each of a plurality of the predetermined entries may be received, and the entry information may include information indicating the order of priority among the plurality of predetermined entries.

With the configuration described above, the order of priority can be set for the plurality of predetermined entries. With this, flexibility and various variations can be provided to the processing for the image data with the predetermined entries.

Further, according to the present embodiment, the method of producing image data may include the deletion step of deleting the predetermined entry from the image data in which the predetermined entry is determined to be present in the determination step. With the configuration described above, a user's request for deleting the predetermined entry from the image data can be fulfilled.

The name of the present disclosure may be varied, including a method of generating image data and a method of generating an image file, in addition to the method of producing image data. The present embodiment discloses a program for executing the method in collaboration with a processor, and a device and a system that execute the method.

In other words, the image reading system 1 includes the reading unit 18 configured to read the document 2, and the control unit configured to cause the reading unit 18 to read the document 2 and generate image data as a result of reading the document 2, determine whether the predetermined entry written by a user in the document 2 is present in the image data, and add the specification information indicating presence of the predetermined entry, to the image data in which the predetermined entry is determined to be present.

Moreover, the image reading system 1 includes: the image reading device 10 including the reading unit 18 and the first control unit 11 as the control unit; and the reading control device 20 including the second control unit 21 and communicably connected to the image reading device 10. The first control unit 11 transmits the image data to the reading control device 20, and the second control unit 21 determines, at the timing at which the image data in a page unit transmitted is received, whether the specification information is added to the image data. This is apparent from the fact that, as illustrated in FIG. 8, the reading control device 20 executes Step S220 directly after the image data for one page is received in Step S210. With this configuration, the processing can be terminated in a shorter time period as compared to a case in which the reading control device 20 determines whether the specification information is added to the image data after receiving the image data in a page unit for all the pages that are sequentially transmitted from the image reading device 10.

Note that, in the scope of the claims, only some of the combinations of the claims are described. However, as a matter of course, the present embodiment includes various combinations of the plurality of dependent claims, as well as one-to-one combinations of the independent claims and the dependent claims.

As an application example of the present embodiment, the present embodiment may be understood by replacing the predetermined entry described above with a sticky note. The sticky note referred to herein is a sticky note that a user actually affixes to a favorite document 2 or a part in the document 2. In other words, a user is caused to set items such as a shape, a color, an affixing position, and the like of the sticky note in advance through the UI screen. Then, the image reading system 1 determines whether the sticky note as an image is present in the image data as a result of reading the document 2, based on the contents of the setting. Further, the specification information indicating presence of the sticky note may be added to the image data with the sticky note. As a matter of course, the image data to which the specification information indicating presence of the sticky note is added may be subjected to various types of processing as described above in the process of image file saving.

What is claimed is:

1. A method of producing image data, the method comprising:
an image data generation step of reading a document by a reading unit and generating image data as a result of reading the document;

a determination step of determining whether a predetermined entry written by a user in the document is present in the image data;
an information addition step of adding specification information indicating presence of the predetermined entry, to the image data in which the predetermined entry is determined to be present in the determination step; and
an information reception step of receiving, from the user, entry information defining the predetermined entry, wherein
in the determination step, whether the predetermined entry is present in the image data is determined based on the entry information.

2. The method of producing image data according to claim 1, the method further comprising
a transport step of transporting the document, wherein
in the image data generation step, the reading unit reads the document transported.

3. The method of producing image data according to claim 1, the method further comprising
an image storage step of inserting the image data to which the specification information is added, at a position of a top page or a position of an end page of the image data for all the documents read by the reading unit, and storing the image data inserted and the image data for all the documents read by the reading unit collectively as one image file.

4. The method of producing image data according to claim 1, wherein
the entry information includes position information for the predetermined entry in the document and
the position information defines each of a position of the predetermined entry at a first surface of the document and a position of the predetermined entry at a second surface being a surface opposite to the first surface of the document.

5. The method of producing image data according to claim 1, wherein
in the information reception step, the entry information relating to each of a plurality of the predetermined entries is received and
the entry information includes information indicating an order of priority among the plurality of predetermined entries.

6. The method of producing image data according to claim 1, the method further comprising
a deletion step of deleting the predetermined entry from the image data in which the predetermined entry is determined to be present in the determination step.

7. A method of producing image data, the method comprising:
an image data generation step of reading a document by a reading unit and generating image data as a result of reading the documents;
a determination step of determining whether a predetermined entry written by a user in the document is present in the image data;
an information addition step of adding specification information indicating presence of the predetermined entry, to the image data in which the predetermined entry is determined to be present in the determination step; and
an image storage step of storing the image data to which the specification information is added, as an image file separate from the image data for all the documents read by the reading unit.

8. The method of producing image data according to claim 7, wherein
in the determination step, whether each of a first entry and a second entry as the predetermined entries is present in the image data is determined and
in the image storage step, the image data to which the specification information indicating presence of the first entry is added and the image data to which the specification information indicating presence of the second entry is added are each stored as a separate image file.

9. The method of producing image data according to claim 7, wherein
the image data to which the specification information is added is stored as the image file separate from the image data for all the documents read by the reading unit and
the image data for all the documents is deleted.

10. A method of producing image data, the method comprising:
an image data generation step of reading a document by a reading unit and generating image data as a result of reading the document;
a determination step of determining whether a predetermined entry that is written by a user in the document and that is indicative of the document being a favorite of a user is present in the image data; and
an information addition step of adding specification information indicating presence of the predetermined entry, to the image data in which the predetermined entry is determined to be present in the determination step.

11. The method of producing image data according to claim 10, the method further comprising
a transport step of transporting the document, wherein
in the image data generation step, the reading unit reads the document transported.

12. The method of producing image data according to claim 10, the method further comprising
an image storage step of storing the image data to which the specification information is added, as an image file separate from the image data for all the documents read by the reading unit.

13. The method of producing image data according to claim 12, wherein
in the determination step, whether each of a first entry and a second entry as the predetermined entries is present in the image data is determined and
in the image storage step, the image data to which the specification information indicating presence of the first entry is added and the image data to which the specification information indicating presence of the second entry is added are each stored as a separate image file.

14. The method of producing image data according to claim 12, wherein
the image data to which the specification information is added is stored as the image file separate from the image data for all the documents read by the reading unit and
the image data for all the documents is deleted.

15. The method of producing image data according to claim 10, the method further comprising
an image storage step of inserting the image data to which the specification information is added, at a position of a top page or a position of an end page of the image data for all the documents read by the reading unit, and storing the image data inserted and the image data for all the documents read by the reading unit collectively as one image file.

16. The method of producing image data according to claim 10, the method further comprising
an information reception step of receiving, from a user, entry information defining the predetermined entry, wherein
in the determination step, whether the predetermined entry is present in the image data is determined based on the entry information.

17. The method of producing image data according to claim 16, wherein
the entry information includes position information for the predetermined entry in the document and
the position information defines each of a position of the predetermined entry at a first surface of the document and a position of the predetermined entry at a second surface being a surface opposite to the first surface of the document.

18. The method of producing image data according to claim 16, wherein
in the information reception step, the entry information relating to each of a plurality of the predetermined entries is received and
the entry information includes information indicating an order of priority among the plurality of predetermined entries.

19. The method of producing image data according to claim 10, the method further comprising
a deletion step of deleting the predetermined entry from the image data in which the predetermined entry is determined to be present in the determination step.

* * * * *